Feb. 9, 1954　　H. A. FLOGAUS　　2,668,468
RIVET
Filed July 7, 1951　　2 Sheets-Sheet 1
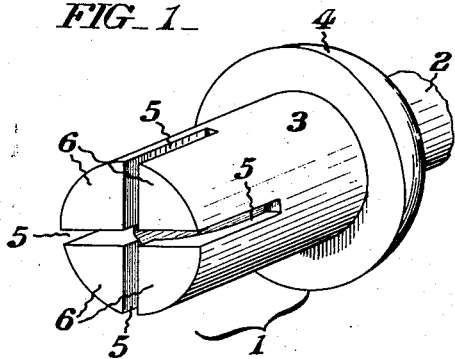
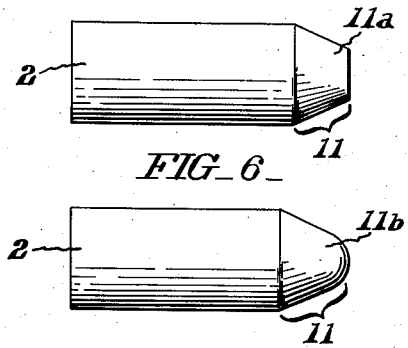
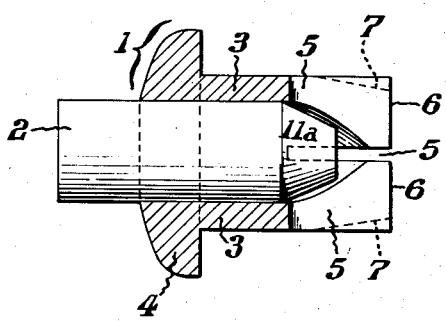
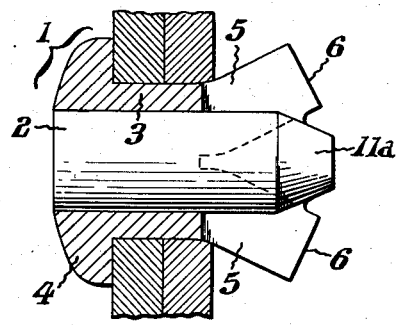
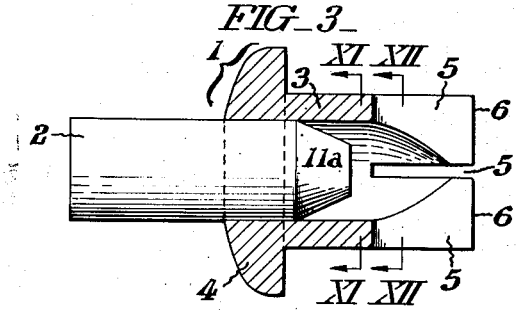
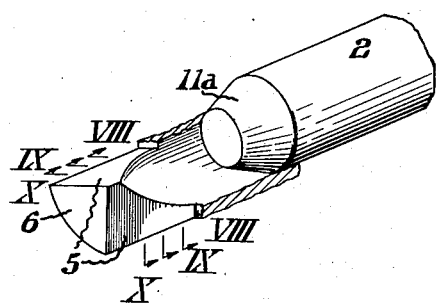
INVENTOR:
Howard A. Flogaus,
BY Paul & Paul
ATTORNEYS.

Feb. 9, 1954     H. A. FLOGAUS     2,668,468
RIVET
Filed July 7, 1951     2 Sheets-Sheet 2
FIG_8_
FIG_9_
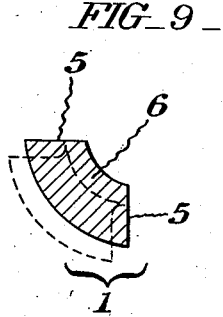
FIG_10_
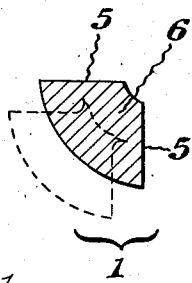
FIG_11_
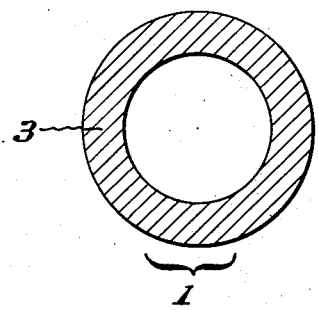
FIG_12_
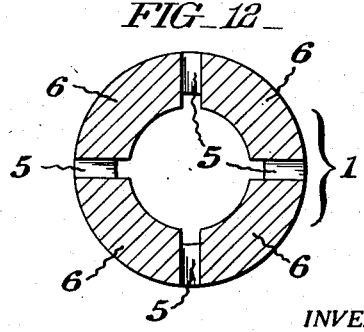
INVENTOR:
Howard A. Flogaus,
BY Paul & Paul
ATTORNEYS.

Patented Feb. 9, 1954

2,668,468

UNITED STATES PATENT OFFICE 2,668,468

RIVET

Howard A. Flogaus, Wallingford, Pa., assignor to South Chester Corporation, Chester, Pa., a corporation of Delaware Application July 7, 1951, Serial No. 235,612

1 Claim. (Cl. 85—40)

This invention relates to a rivet for securing structural elements together, such as metal plates, or for attaching plates or other devices to panels of wood, steel, plastic or other materials; and particularly to a rivet which is adapted to be expanded by driving a pin or the like through a shaped opening in the interior thereof. Expanding rivets have been known in the art for many years and as heretofore designed and constructed they have involved certain disadvantages which are overcome by the present invention. The present application is a continuation-in-part of my earlier application filed under date of June 15, 1946, Serial No. 677,017, now abandoned.

One object of my invention is to provide a rivet which can be readily applied to the parts to be secured and which is so formed initially that only a few simple operations are required to insert the rivet in the hole to which it is to be applied, and thereafter to drive the pin and expand the rivet until it becomes firmly lodged in its final position.

Another object of the invention is to increase the holding power of the rivet and to give it added resistance to fatigue failure by forming in a special manner those portions thereof which are adapted to be radially expanded by engagement with the aforementioned spreader pin, and particularly to provide a specially shaped inner surface for each of the expandable elements whereby substantial line contact between the inner surface of the expanded elements and the spreader pin is brought about when the spreader element is driven into its final position.

A further object of the invention is to preassemble the rivet and its spreader pin in such manner that the two pieces as soon as they have been fabricated are locked together and are thus maintained in mutual association both before and after application to the parts to be riveted. This not only simplifies the operations involved in driving the pin but incidentally makes it easier to set the rivet in its initial position because the pre-assembly of the parts, at least in the preferred form of the invention, involves a clinching of the spreader pin by contractible prongs, and the contraction of the prongs forms a tapered end for the rivet which facilitates entry into the hole in which the rivet is applied.

Other objects and advantages characterizing the invention including those derived from simplicity of construction, assembly and application will become more apparent from the description of certain practical embodiments of the invention which follows hereinafter and has reference to the accompanying drawings. In the drawings:

Fig. 1 is a perspective view of a rivet embodying my invention and having its spreader pin inserted therein.

Fig. 2 is a longitudinal sectional view of the same.

Fig. 3 is a sectional view similar to Fig. 2 but with the pin withdrawn from the seat.

Fig. 4 is a sectional view illustrating the condition which results after driving the spreader pin fully into the rivet.

Figs. 5 and 6 show two forms of spreader pins, each differing as to the shape of the end of the pin.

Fig. 7 is a perspective view showing the inner surface of one of the expansible elements of the rivet of Fig. 1 with the pin shown in the position of Fig. 3.

Fig. 8 is a combined sectional view taken as indicated by the lines VIII—VIII of Fig. 7. The full lines illustrate the unexpanded condition and the dotted lines indicate the expanded condition.

Fig. 9 is a combined sectional view taken as indicated by the lines IX—IX of Fig. 7.

Fig. 10 is a combined sectional view taken as indicated by the lines X—X of Fig. 7.

Fig. 11 is a sectional view taken as indicated by the lines XI—XI of Fig. 3.

Fig. 12 is a sectional view taken as indicated by the lines XII—XII of Fig. 3.

In the drawings, with special reference to Figs. 1 to 4, a rivet embodying my invention is shown at 1 and the spreader pin used therewith is shown at 2. The rivet 1 includes a tubular shank 3 having a mushroom-shaped head 4 at one end thereof and slotted at the opposite end as indicated at 5, to form expansible and contractible prongs 6. Within the tubular shank 3 the spreader pin 2 is first inserted in the manner shown in Fig. 3. By a suitable tool the prongs 6 may thereafter be contracted to clinch the pin 2. When the pieces 1 and 2 are thus pre-assembled they are ready to be used, and it will be observed that contraction of the prongs 6 produces an external taper at 7 constituting a smooth continuation of the cylindrical outer surface of the shank with all portions maintained within the confines of the cylinder of indefinite length coinciding with the exterior surface of the shank. This facilitates the entry of the rivet into the hole or bore to which it is to be applied so that it is a relatively simple operation to set the rivet within the parts which are to be secured thereby.

In its preferred form the spreader pin 2 is cylindrical and has a bevelled end 11 for engagement with the prongs 6. The particular shape of the beveled end 11 may vary according to the use to which the rivet is to be put. In Figs. 5 and 6 there are shown examples of a spreader pin 2 having respectively a truncated end 11a and a partly tapered and partly rounded end 11b.

The shape of the seat which is formed within the rivet 1 is shown in detail in Figs. 3, 7 and 12. Each of these views shows the construction of the seat with the prongs in their unexpanded position. The inner surface of each prong is concave as shown in Fig. 7. This concave surface is not conical as in the case of some of the prior are rivets. As shown in Figs. 2, 3, 7, 8, 9 and 10 the concave surface has a progressively narrowing diameter which provides an opening which in longitudinal section is in the general form of a curve having parabolic characteristics. The radii of the concentric circles constituting horizontal sections taken through the seat from the proximal to the distal end are selected so that the surface of the seat presents a small amount of metal to the advancing pin as the prongs expand without leaving a gap between the inner surface of the prongs and the pin, which is the usual result where a cylindrical pin is driven into a conical seat. Since the amount of metal in the seat presented to the pin is relatively small, the ultimate line contact as between the inner surface of the prongs and the surface of the pin is brought about by plastic deformation of the metal forming the inner surface of the prongs. This deformation action is made more certain by providing a pin of harder metal than the metal forming the surface of the prongs. As a result of the plastic deformation taken in combination with the line contact as between the pin and prongs, the gripping action of the prongs on the pin is greatly enhanced. In addition to this increased holding action of the prongs on the pin, the controlled volume of metal in the prong area substantially extends the gripping range of the rivet and thus makes it possible to fasten articles covering a wider range in thickness than the usual conical seat expanding rivet. Likewise the line contact surface provides a much stronger support for the prongs over a wider range and particularly provides support in the fatigue zone where support is most needed. Line contact between the prongs and the pin is taken care of by plastic deformation of the inner surfaces of the prongs, particularly at the lower end of the seat, as shown in Fig. 4. This is brought about by making the reduction in diameter of the seat toward its distal end such that on expansion of the prongs by the pin a small amount of metal at the surface of the seat takes a position just inside the line of the extension of the tubular portion at the proximal end of the rivet. There is thus a continual deformation taking place between the advancing pin and the surface of the seat with the result that plastic deformation is continued throughout substantially the length of the seat as the pin advances and as the seat widens on expansion of the prongs. Due to the general conformation of the inner surface of the seat to the pin when the prongs expand, there is only a relatively small amount of such plastic deformation required and this fills any minor gaps whereas a seat construction of the conical type heretofore employed in the art does not achieve line contact with the pin since the degree of plastic deformation available is not sufficient to make up for the non-conformity resulting on expansion of the prongs. As a result, the expanded prongs of the prior art rivets do not grip the pin in a line contact relationship as in the case of the present invention. This line contact gripping is of great importance in maintaining a tight fit as between the pin and the rivet over long periods of time and under conditions of vibration. Likewise a much more substantial support for the expanded prongs is provided by the line contact combination and this reduces the chances of fatigue failure of the prongs since the usual fatigue zone is reinforced throughout its length by engagement with the pin.

Having thus described my invention, I claim:

In combination in a tubular metallic rivet, a substantially cylindrical shank portion, a head integrally formed at one end thereof, a cylindrical bore extending through said head portion and terminating at a point substantially beyond said head portion but short of the distal end of said shank, a plurality of expansible prongs formed at the distal end of said shank and extending at least to the distal end of said bore, a concave cavity having transverse circular sections throughout and having axial sections extending tangentially from the cylindrical bore through a slow curve terminating substantially short of the distal end of said prongs, a metallic spreader pin having a cylindrical portion substantially as long as the length of said cylindrical bore plus the length of said cavity, inner surfaces on said prongs comprising cam means whereby said prongs are expanded so that the cam surfaces will engage said pin with surface contact throughout the length of the cylindrical portion of the pin from the distal end of the bore to the distal end of the cylindrical portion of the pin.

HOWARD A. FLOGAUS.

References Cited in the file of this patent

UNITED STATES PATENTS

| Number | Name | Date |
| --- | --- | --- |
| 1,643,771 | Iseman | Sept. 27, 1927 |
| 2,301,244 | Bishop | Nov. 10, 1942 |

FOREIGN PATENTS

| Number | Country | Date |
| --- | --- | --- |
| 563,295 | Great Britain | Aug. 8, 1944 |
| 909,215 | France | May 2, 1946 |